(12) United States Patent
Marecek et al.

(10) Patent No.: US 10,585,885 B2
(45) Date of Patent: *Mar. 10, 2020

(54) ESTIMATING THE COST OF DATA-MINING SERVICES

(71) Applicant: International Business Machines Corporation, Armonk, NY (US)

(72) Inventors: Jakub Marecek, Dublin (IE);
Dimitrios Mavroeidis, Utrecht (NL);
Pascal Pompey, Nanterre (FR);
Michael Wurst, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 495 days.

This patent is subject to a terminal disclaimer.

(21) Appl. No.: 15/149,216

(22) Filed: May 9, 2016

(65) Prior Publication Data

US 2016/0350377 A1 Dec. 1, 2016

Related U.S. Application Data

(63) Continuation of application No. 14/725,409, filed on May 29, 2015, now Pat. No. 10,417,226.

(51) Int. Cl.
G06F 16/2453 (2019.01)
G06F 16/2458 (2019.01)

(52) U.S. Cl.
CPC .... G06F 16/24532 (2019.01); G06F 16/2465 (2019.01); G06F 16/2471 (2019.01)

(58) Field of Classification Search
CPC ......... G06F 17/30445; G06F 17/30539; G06F 17/30545; G06F 17/30572; G06F 16/244; G06F 16/24542; G06F 16/2465; G06F 16/24537; G06F 16/2453; G06F 16/24545;
(Continued)

(56) References Cited

U.S. PATENT DOCUMENTS 7,941,387 B2  5/2011 Amini et al.
8,504,443 B2  8/2013 Ferris et al.
8,612,284 B1  12/2013 Sharif et al.
(Continued)

FOREIGN PATENT DOCUMENTS

CN  101840431 A  9/2010
CN  103747477 A  4/2014
(Continued)

OTHER PUBLICATIONS

Marecek, et al., U.S. Appl. No. 14/725,409, filed May 29, 2015 (a copy is not provided as this application is available to the Examiner).
(Continued)

Primary Examiner — James Trujillo
Assistant Examiner — Fariborz Khoshnoodi
(74) Attorney, Agent, or Firm — Lance I. Hochhauser; David K. Mattheis

(57) ABSTRACT

The cost of data-mining is estimated where data-mining services are delivered via a distributed computing system environment. System requirements are estimated for a particular data-mining task for an input data set having specified properties. Estimating system requirements includes applying a partial learning tool to operate on sample data from the input data set.

18 Claims, 5 Drawing Sheets

(58) Field of Classification Search
CPC ........... G06F 16/2456; G06F 16/24534; G06F 16/24544
USPC ................................................ 707/713, 719
See application file for complete search history.

(56) References Cited

U.S. PATENT DOCUMENTS

| | | | |
|---|---|---|---|
| 8,756,323 | B2 | 6/2014 | Behrendt et al. |
| 10,417,226 | B2 | 9/2019 | Marecek |
| 2003/0212691 | A1* | 11/2003 | Kuntala ................... G06F 16/30 |
| 2005/0177549 | A1* | 8/2005 | Hornick ................... G06F 9/505 |
| 2007/0174290 | A1* | 7/2007 | Narang ................... G06Q 10/06 |
| 2008/0154821 | A1 | 6/2008 | Poulin |
| 2011/0145094 | A1 | 6/2011 | Dawson et al. |
| 2012/0053925 | A1 | 3/2012 | Geffin et al. |
| 2014/0115592 | A1 | 4/2014 | Frean et al. |
| 2014/0229221 | A1 | 8/2014 | Shih |
| 2014/0257909 | A1* | 9/2014 | Anders ............ G06Q 10/06313 705/7.23 |
| 2014/0278807 | A1 | 9/2014 | Bohacek |
| 2015/0271023 | A1* | 9/2015 | Anderson ............. H04L 41/145 709/223 |

FOREIGN PATENT DOCUMENTS

| | | |
|---|---|---|
| CN | 107615275 A | 1/2018 |
| DE | 112016001902 T5 | 1/2018 |
| GB | 2554323 A | 3/2018 |
| JP | 2018524672 A | 8/2018 |
| WO | 2013192059 A2 | 12/2013 |

OTHER PUBLICATIONS

Patent Cooperation Treaty, PCT, Notification of Transmittal of the International Search Report and the Written Opinion of the International Searching Authority, or the Declaration, dated Aug. 29, 2016, Applicant's File Reference DE921050023PCT1, International Filing Date May 19, 2016, International Application No. PCT/IB2016/052951, 10 pages.

"Amazon Machine Learning Pricing", © 2015, Amazon Web Services, Inc. or its affiliates, downloaded on May 29, 2015, 7 pages, <http://aws.amazon.com/machine-learning/pricing/>.

"Prediction API—Pricing and Terms of Service", Google Cloud Platform, last updated Apr. 23, 2015, 9 pages, <https://cloud.google.com/prediction/pricing>.

Andrzejak et al, "Decision Model for Cloud Computing under SLA Constraints", HAL, archives-ouvertes, Research Report, Submitted on: Apr. 21, 2010, 10 pages.

Buyya et al., "Market-Oriented Cloud Computing: Vision, Hype, and Reality for Delivering IT Services as Computing Utilities", The 10th IEEE International Conference on High Performance Computing and Communications, © 2008, IEEE, pp. 5-13.

Chaisiri et al., "Optimization of Resource Provisioning Cost in Cloud Computing", IEEE Computer Society, IEEE Transactions on Services Computing, vol. 5, No. 2, Apr.-Jun. 2012, Manuscript revised Sep. 6, 2010, accepted Jan. 28, 2011, published online Feb. 7, 2011, © 2012 IEEE, pp. 164-177.

Halko et al., "Finding Structure with Randomness: Probabilistic Algorithms for Constructing Approximate Matrix Decompositions", SIAM Review, vol. 53, No. 2, published electronically May 5, 2011, © 2011 Society for Industrial and Applied Mathematics, pp. 217-288.

Hutter et al., "Performance Prediction and Automated Tuning of Randomized and Parametric Algorithms", F. Benhamou (Ed.): CP 2006, LNCS 4204, pp. 213-228, 2006, © Springer-Verlag Berlin Heidelberg 2006.

IBM, Appendix P, List of IBM Patents or Patent Applications Treated as Related, dated Oct. 16, 2019, 2 pages.

Jordan, "On statistics, computation and scalability", Bernoulli; 19(4), 2013, pp. 1378-1390; © 2013 ISI/BS.

Kadioglu et al., "ISAC—Instance-Specific Algorithm Configuration", ECAI, 2010, H. Coelho et al. (Eds.) IOS Press, 2010, © 2010 The authors and IOS Press, pp. 751-756.

Marecek et al., "Distributed Block Coordinate Descent for Minimizing Partially Separable Functions", Cornell University Library, in Recent Developments in Numerical Analysis and Optimization, 2015, arXiv:1406.0238v2 [math.OC], Feb. 10, 2015, pp. 1-25, <http://arxiv.org/abs/1406.0238>.

Martens et al., "Decision-making in cloud computing environments: A cost and risk based approach", Springer; Inf Syst Front (2012) 14:871-893, Published online: Jul. 26, 2011, © Springer Science+ Business Media, LLC, 2011.

Meila et al., "A Random Walks View of Spectral Segmentation", Robotics Institute: Carnegie Mellon University, AI and Statistics (AISTATS), 2001, 6 pages, <http://www.ri.cmu.edu/publication_view.html?pub_id=3807>.

Meila et al., "Clustering by weighted cuts in directed graphs", Citeseerx, 2007, In Proceedings of the 2007 SIAM International Conference on Data Mining, © by SIAM, pp. 135-144, <http://citeseerx.ist.psu.edu/viewdoc/summary?doi=10.1.1.215.1927>.

Nesterov, "Nonsmooth Convex Optimization", 'Introductory Lectures on Convex Optimization: A Basic Course', Springer, © 2004, Kluwer Academic Publishers, Printed in the United Kingdom by Biddles/IBT Global, pp. 111-170, 2004, <http://rd.springer.com/book/10.1007%2F978-1-4419-8853-9>.

Richtarik et al., "Iteration Complexity of Randomized Block-Coordinate Descent Methods for Minimizing a Composite Function", Cornell University Library, arXiv:1107.2848v1 [math.OC], Jul. 14, 2011, pp. 1-33, <http://arxiv.org/abs/1107.2848>.

Von Luxburg, "A Tutorial on Spectral Clustering", Statistics and Computing, 17 (4), Dec. 2007, pp. 1-32, <http://rd.springer.com/article/10.1007%2Fs11222-007-9033-z>.

* cited by examiner

ESTIMATING THE COST OF DATA-MINING SERVICES

BACKGROUND

The present invention relates generally to the field of data processing and more particularly to database and file access cost estimates.

Information about the expected cost of complex operations is of key importance for software as a service offerings. Customers are often billed dynamically based on actual resource consumption. This is true for tasks that usually consume large amounts of computer processing (CPU), disk I/O, and main memory, such as data-mining and big data analytics. Solutions exist for estimating the cost of resources needed for simple queries on large data bases, using an execution plan.

SUMMARY

According to an aspect of the present invention, there is a method, computer program product, and/or system that performs the following steps (not necessarily in the following order): (i) receiving a set of task parameters, the set of task parameters defining a target data set and a data-mining task; (ii) receiving a set of control values, the set of control values describing the data-mining task; (iii) receiving a set of data descriptors, the set of data descriptors describing the target data set; and (iv) estimating a set of computational resources required to perform the data-mining task over a distributed computing system based at least in part on the set of task parameters, the set of control values, the set of data descriptors, and an availability of the distributed computing system. At least the estimating step is performed by computer software running on computer hardware.

According to an aspect of the present invention, there is a method, computer program product, and/or system that performs the following steps (not necessarily in the following order): (i) receiving a data set; (ii) receiving a set of control values; (iii) receiving a set of data-mining task parameters; and (iv) estimating a set of computational resources required to perform a data-mining task. The set of control values describes the data-mining task. The set of data-mining task parameters defines the data set and the data-mining task. The set of computational resources is based at least in part on the data set, the set of control values, and the set of data-mining task parameters. At least the estimating step is performed by computer software running on computer hardware.

DETAILED DESCRIPTION

Figure 1:
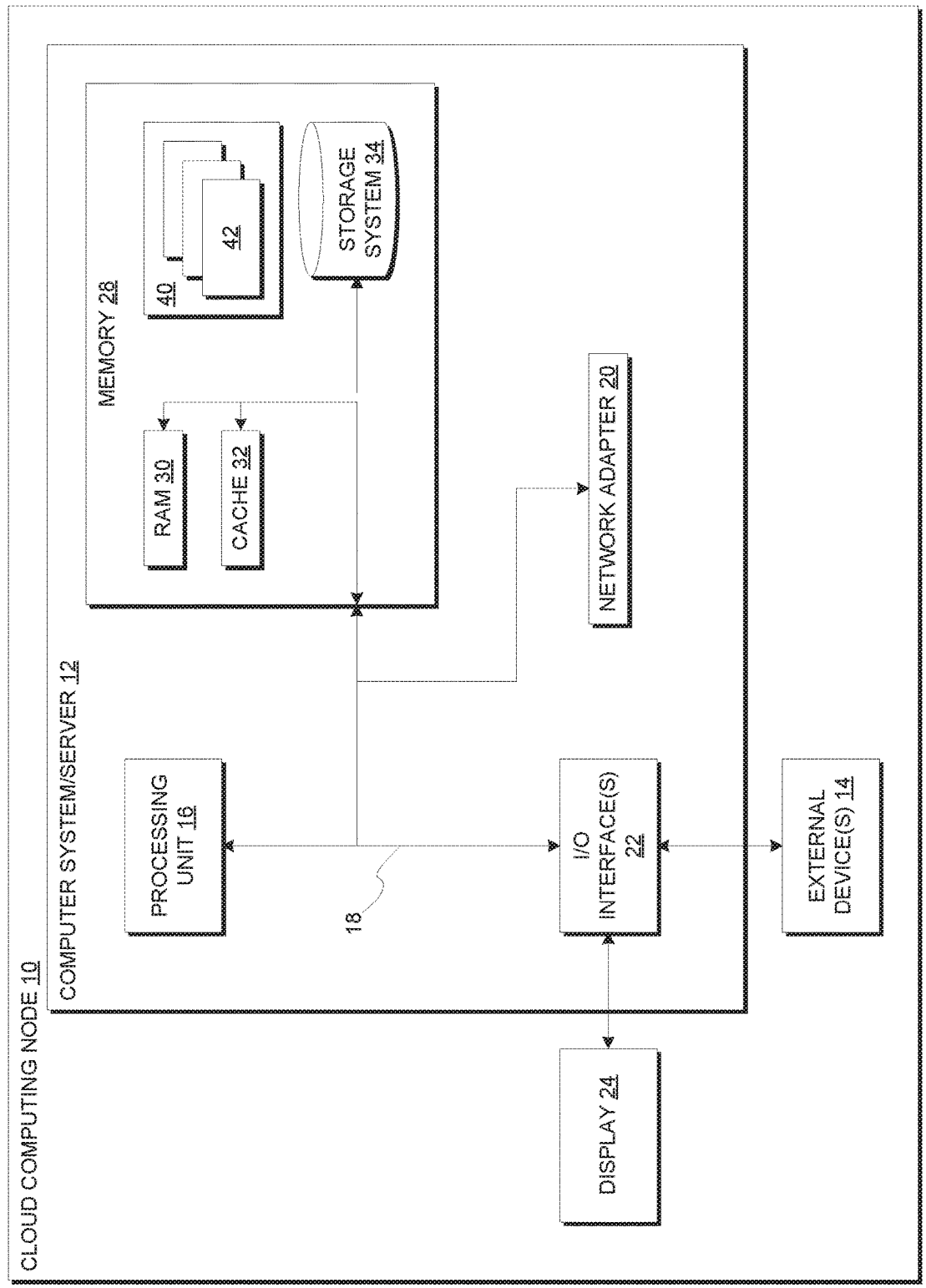
FIG. 1 depicts a cloud computing node according to an embodiment of the present invention.

The cost of data-mining is estimated where data-mining services are delivered via a distributed computing system environment. System requirements are estimated for a particular data-mining task for an input data set having specified properties. Estimating system requirements includes applying a partial learning tool to operate on sample data from the input data set.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, processing units 16, a system memory 28, and a bus 18 that couples various system components including system memory 28 to processing units 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having set of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Set of program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
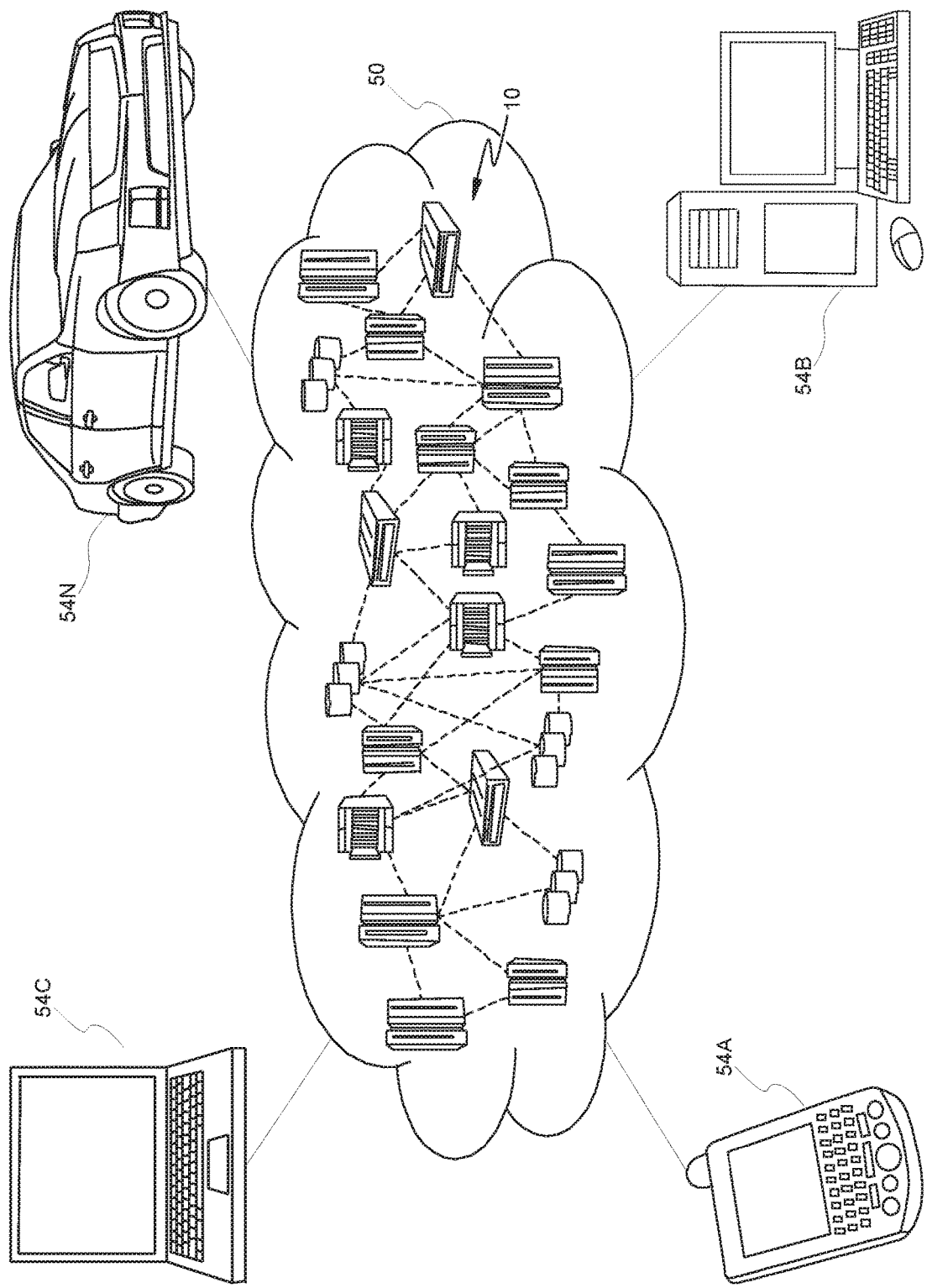
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes (e.g., cloud computing node 10) with which local computing devices used by cloud consumers, such as, for example, personal digital assistant (PDA) or cellular telephone 54A, desktop computer 54B, laptop computer 54C, and/or automobile computer system 54N may communicate. Cloud computing nodes may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that cloud computing node 10 and cloud computing environment 50 can communicate with any type of computerized device over any type of network and/or network addressable connection (e.g., using a web browser).

Figure 3:
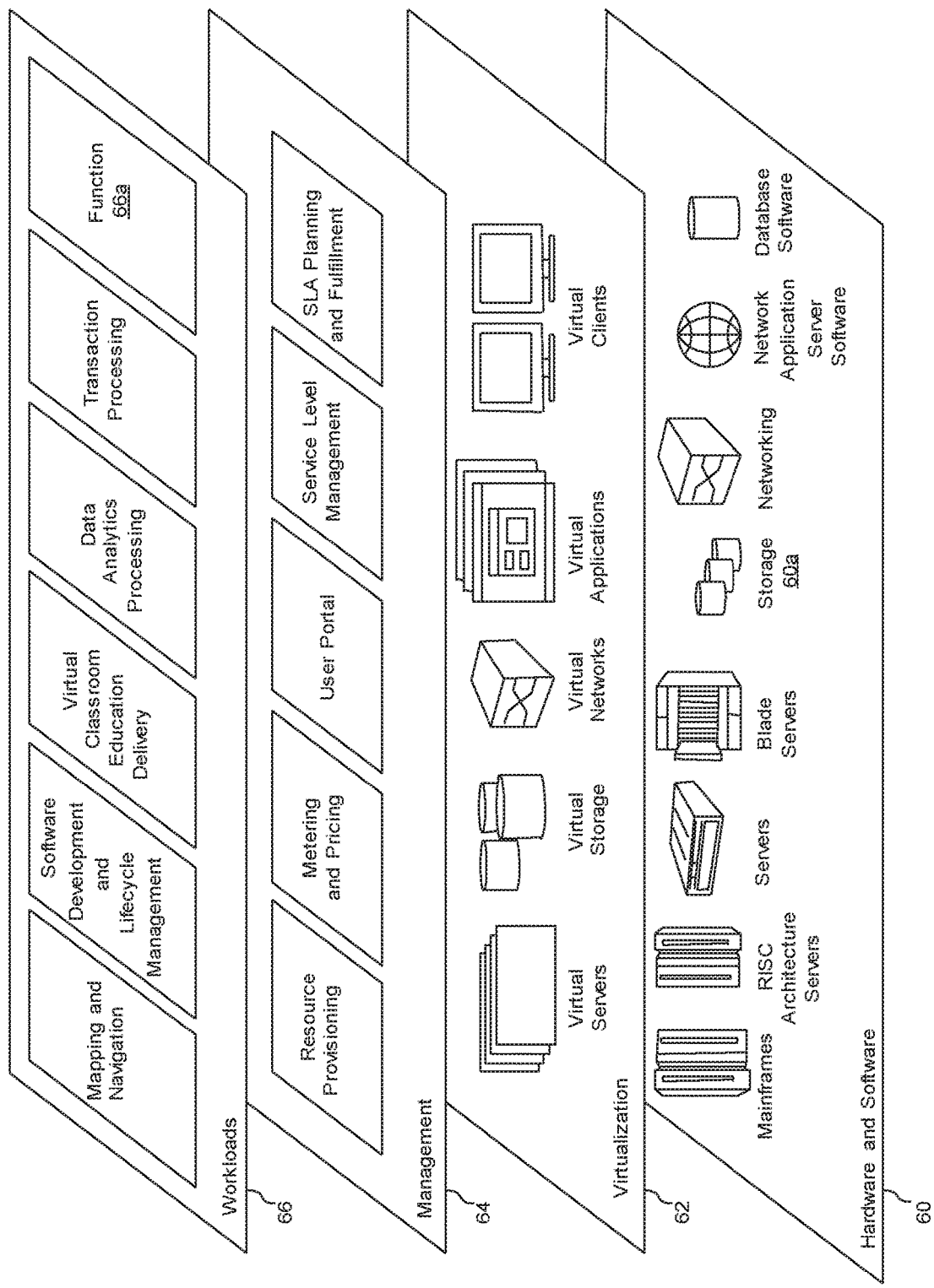
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided.

Hardware and software layer 60 includes hardware and software components. Examples of hardware components include mainframes; RISC (Reduced Instruction Set Computer) architecture based servers; storage devices; networks and networking components. In some embodiments software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and functionality according to the present invention (see function block 66a) as will be discussed in detail, below, in the following sub-sections of this detailed description section.

Some embodiments of the present invention relate to a computer-implemented method for estimating computational resources for running a data-mining task over a distributed computing system, the method comprising: (i) receiving a data set, based on which the data-mining task is performed and/or receiving a set of data descriptors describing or bounding features of the data set relevant for estimating computational resources for running the data-mining task; (ii) receiving a set of control values for the data-mining task; (iii) receiving a set of task parameters, the set of task parameters defining the data-mining task to be performed on the data set; (iv) estimating a set of computational resources for performing the data-mining task over the distributed computing system based on the received data set or the received set of data descriptors, the set of control values, and the set of task parameters.

Some embodiments of the present invention include providing a set of cost data based on a value range of a set of control variables. In some embodiments of the present invention, a set of cost data includes multiple cost values associated with a set of control variables. In some embodiments of the present invention, a set of cost data is derived for a time period or a range of accuracy. In some embodiments of the present invention, a set of cost data is provided to a user over a graphical user interface. In some embodiments of the present invention, a set of cost data is displayed as a function of a set of control variables. In some embodiments of the present invention, a set of cost data is provided to a user as a graph. In some embodiments of the present invention, a set of cost data is displayed as a dependency on a set of control values.

In some embodiments of the present invention, a set of feedback information is received. In some embodiments of the present invention, a set of feedback information includes information regarding a set of prior data-mining task cost estimations. In some embodiments of the present invention, a set of feedback information includes a set of actual costs for a set of prior data-mining task cost estimations. In some embodiments of the present invention, a cost estimate is calculated based, at least in part, on a set of actual costs for a set of prior data-mining task cost estimate and on a set of prior data-mining task cost estimates. In some embodiments of the present invention, calculation of a cost estimate includes an adaptive machine learning algorithm. In some embodiments of the present invention, an adaptive machine learning algorithm improve the cost estimation. In some embodiments of the present invention, an adaptive machine learning algorithm improves a set of cost estimates to reduce the difference between a set of costs estimates and a set of actual costs.

Some embodiments of the present invention include one or more of the following features: (i) calculating a set of process flows for processing a data-mining task; (ii) estimating a computational effort required to process a data-mining task for each process flow in a set of process flows; (iii) estimating a cost to process a data-mining task on a distributed computing system for each process flow in a set of process flows; and/or (iv) choosing a process flow in a set of process flows having a lowest cost to process a data-mining task. In some embodiments of the present invention, a process flow in the set of process flows is selected according to the lowest cost while complying with a set of other constraints. In some embodiments of the present invention, selecting a process flow of a set of process flows based on cost improves a set of future cost estimates.

Figure 4:
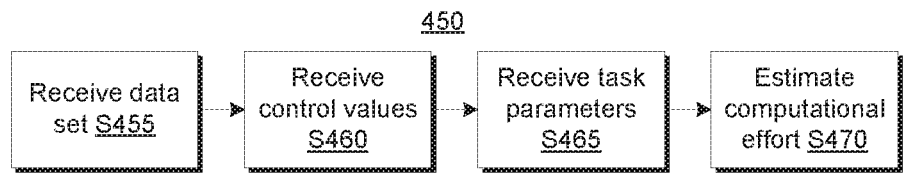
FIG. 4 is a flowchart showing a first embodiment method performed, at least in part, by the first embodiment system.
Figure 5:
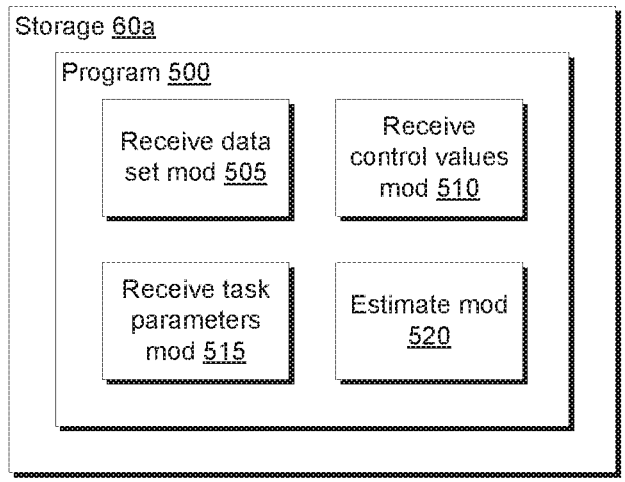
FIG. 5 is a block diagram view of a machine logic (for example, software) portion of the first embodiment system.

FIG. 4 shows flowchart 450 depicting a method for estimating the computational effort of a data-mining task, including the computational resources necessary for running a data-mining task based on a block diagram, according to the present invention. FIG. 5 shows program 500, which performs at least some of the method steps of flowchart 450. This method and associated software will now be discussed, over the course of the following paragraphs, with extensive reference to FIG. 4 (for the method step blocks) and FIG. 5 (for the software blocks). In this example computer system/server 12 determines the resources required to complete a data-mining task.

Processing begins at step S455, where receive data set module ("mod") 505 receives a data set on which a data-mining task is to be performed. In some embodiments of the present invention, the data set is a set of data descriptors. In some embodiments of the present invention, the data is a matrix A with m rows and N columns, Expression (1):

$$A \in R^{m \times n} \quad (1)$$

In some embodiments of the present invention, receive data set mod 505 receives a data set and a set of data descriptors. In some embodiments of the present invention, the set of data descriptors describes a set of characteristics of the data in the data set. In some embodiments of the present invention, the set of data descriptors indicates whether the data set has a certain data property. In some embodiments of the present invention, the set of data descriptors describes and/or bounds a set of features of the data set that are relevant for estimating computational resources required for running a data-mining task. In some embodiments of the present invention, the set of data descriptors describes the computational resources necessary for running a data-mining task based on a block diagram.

In some embodiments of the present invention, the set of data descriptors describe a set of key features of the data set. In some embodiments of the present invention, the set of data descriptors bound a set of key features of the data set. In some embodiments of the present invention, the set of key features of the data set are relevant for estimating the computational resources required for the data-mining task. In some embodiments of the present invention, separation of the set of data descriptors from the data set is complex. In some embodiments the set of data descriptors result from a set of computations on the data set.

Processing proceeds to step S460, where receive control values mod 510 receives a set of control values associated with the data-mining task. In some embodiments of the present invention, the set of control values influences the amount of computational resources required for processing a data-mining task. In some embodiments of the present invention, control values mod 510 is influenced by the accuracy of the estimation and the point of time until the estimation must be completed. In some embodiments of the present inventions, receive control values mod 510 receive a set of control values from a user or an application. In some embodiments of the present invention, receive control values mod 510 receive the set of control values from an estimation system.

Processing proceeds to step S465, where receive task parameters mod 515 receives a set of task parameters. In some embodiments of the present invention, the set of task parameters defines a set of characteristics of the data-mining task to be performed on the data set. In some embodiments of the present invention, the set of task parameters includes an algorithm classifier. In some embodiments of the present invention, the algorithm classifier specifies the algorithm to be used to perform the data-mining task. In some embodiments of the present invention, the algorithm classifier directly denotes an algorithm to be used. In some embodiments of the present invention, the algorithm classifier includes a set of metadata. In some embodiments of the present invention, the set of metadata included in the algorithm classifier indicates a certain data-mining algorithm. In some embodiments of the present invention, the algorithm classifier indicates that the data-mining task is a regression task. In some embodiments of the present invention, the algorithm classifier indicates that the data-mining task is a classification task. In some embodiments of the present invention, the algorithm classifier indicates that the data-mining task is a clustering task.

In some embodiments of the present invention, a regression task (or a regression model) involves a data-mining function to predict a continuous value based on a set of information included in a data set. In some embodiments of the present invention, a regression model is used to predict the value of a house based on a data set including factors about the house (e.g., location, size, nearby property values). In some embodiments of the present invention a classification task (or a classification model) involves a data-mining function to assign a set of items to a set of classes or to a set of categories. In some embodiments of the present invention, a classification model is used to predict a target class for each datum in a data set. In some embodiments of the present invention, a classification model is used to classify a set of emails as "spam" or "not spam." In some embodiments of the present invention a clustering task (or a clustering model) involves a data-mining function to identify a similar set of data, based on a set of characteristics. In some embodiments of the present invention, a clustering model is used to identify a set of high-quality clusters such that the inter-cluster similarity is low. In some embodiments of the present invention, a clustering model is used to identify a high-quality cluster such that the intra-cluster similarity is high. In some embodiments of the present invention, regression models, classification models, and clustering models are employed for a variety of data-mining tasks.

In some embodiments of the present invention, the data-mining function is a supervised data-mining process. In some embodiments of the present invention, the data-mining function is an unsupervised data-mining process. In some embodiments of the present invention, an unsupervised data-mining process includes machine learning. In some embodiments of the present invention, a regression model is a supervised data-mining process. In some embodiments of the present invention, a classification model is a supervised data-mining process. In some embodiments of the present invention, a clustering model is an unsupervised data-mining process. In some embodiments of the present invention, supervised data-mining includes a set of training data. In some embodiments of the present invention, computer system/server 12 must correlate the data set in a similar manner to the set of training data, a "similarity." In some embodiments of the present invention, a regression model creates a continuous interval. In some embodiments of the present invention, a classification model creates a set of discrete intervals. In some embodiments of the present invention, a set of training data is represented by a matrix A, see Expression (1), above. In some embodiments of the present invention, a row in the matrix A corresponds to an element in a vector y:

$$y \in R^m \tag{2}$$

In some embodiments of the present invention, a column in the matrix A is called a "feature." In some embodiments of the present invention, a row in the matrix A is called an "observation." In some embodiments of the present invention, a "similarity" is expressed by a loss function. In some embodiments of the present invention, a loss function measures how similar items are. In some embodiments of the present invention, loss function may be one of:

$$\mathcal{L}_{SL}(x, A_{j:}, y^{(j)}) := \tfrac{1}{2}(y^{(j)} A_{j:} x)^2 \tag{3}$$

$$\mathcal{L}_{LL}(x, A_{j:}, y^{(j)}) := \log(1 + e^{-y^{(j)} A_{j:} x}) \tag{4}$$

$$\mathcal{L}_{HL}(x, A_{j:}, y^{(j)}) := \tfrac{1}{2} \max\{0, 1 - y^{(j)} A_{j:} x\}^2 \tag{5}$$

In some embodiments of the present invention, Expression (3) represents a "square loss." In some embodiments of the present invention, Expression (4) represents a "logistic loss." In some embodiments of the present invention, Expression (5) represents a "hinge square loss." In some embodiments of the present invention, $A_{j:}$ represents the jth row of the matrix A.

In some embodiments of the present invention, a regularization function captures a set of preferences among similar items. For example, humans have a preference for simple-to-explain things, which can be captured by the number coefficients required. In some embodiments of the present invention, a column in the matrix A corresponds to an element in a vector x:

$$x \in R^N \tag{6}$$

In some embodiments of the present invention, a composite function is used to find a vector x:

$$\min_{x \in R^N} F(x) := y\|x\|_1 + \sum_{j=1}^{m} \mathcal{L}(x, A_{j:}, y^{(j)}) \tag{7}$$

In some embodiments of the present invention, $\mathcal{L}(x, A_{j:}, y^{(j)})$ represents one of the loss Expressions (2), (3), or (4). In some embodiments of the present invention, $\|x\|_1$ represents the number of non-zero elements of the vector x. In some embodiments of the present invention, a convex combination is employed with a coefficient $\gamma \in R$.

In some embodiments of the present invention, the set of data descriptors received in step S455 vary with the type of data-mining function employed by computer system-server 12. In some embodiments of the present invention, a set of data descriptors for supervised data-mining functions includes, but is not limited to: (i) a number, n, of features in (the dimension of) the data set; (ii) a number, m, of described items in the data set; (iii) for a block-structured data set, a number of blocks in the data set; (iv) a degree of partial separability of a smooth convex term of Expression (7), $\mathcal{L}$ (e.g. k-cut in a corresponding hypergraph); (v) a power of the largest eigenvalue, $L = \sigma_{max}^2(A)$; (vi) a condition number, $\sigma_{max}(A)/\sigma_{min}(A)$; and/or (vii) a number of non-zero values in a column or block i of matrix A, $\|A_{:i}\|_0$. In some embodiments of the present invention, the condition number is based on a set of eigenvalues of the matrix A. In some embodiments of the present invention, $\sigma_{max}(A)$ is the largest eigenvalue of the matrix A. In some embodiments of the present invention, $\sigma_{min}(A)$ is the smallest eigenvalue of the matrix A. In some embodiments of the present invention, the condition number relates to the number of iterations performed. In some embodiments of the present invention, $\|A_{:i}\|_0$ provides a bound on the smoothness of the regularization function. In some embodiments of the present invention, $\|A_{:i}\|_0$. Provides a bound on the partial separability of the regularization function. In some embodiments of the present invention, $\|_{:i}\|_0$ replaces a set of data descriptors that incur more computing resources.

In some embodiments of the present invention, unsupervised data-mining (or unsupervised machine learning) partitions a set of elements through clustering. In some embodiments of the present invention, a clustering algorithm operates on matrix A, represented by Expression (1). In some embodiments of the present invention, the rows of matrix A correspond to a set of instances (or a set of observations). In some embodiments of the present invention, the set of instances include a set of N features. In some embodiments of the present invention, a set of clustering algorithms operate on a weighted graph G=(V, W). In some embodiments of the present invention, matrix W (also matrix W(i,j)) represents a set of weights connecting vertices i and j. In some embodiments of the present invention, matrix W is an m×m matrix. In some embodiments of the present invention, matrix W is represented by the corresponding graph Laplacian matrix L. In some embodiments of the present invention, a clustering algorithm requires a notion of similarity between data instances. In some embodiments of the present invention, a clustering algorithm requires an objective function that determines the structure of the optimal data partitioning. In some embodiments of the present invention, a clustering algorithm is selected from the group:

$$CA := \arg\min_{(C_1, C_2, \dots, C_k)} \left( \sum_{i=1}^{k} \sum_{x_j \in C_i} \|x_j - \mu_k\| \right) \tag{8}$$

$$CA := \arg\min_{(C_1, C_2, \dots, C_k)} \left( \sum_{i=1}^{k} \sum_{j \in C_i, m \in \overline{C_i}} \frac{W_{jm}}{vol(C_i)} \right) \tag{9}$$

In some embodiments of the present invention, Expression (8) is a k-means clustering algorithm. In some embodiments of the present invention, Expression (9) is a normalized cut clustering algorithm.

In some embodiments of the present invention, Expression (8) identifies the optimal k clusters, $C_1$ through $C_k$, such that a set of Euclidean distances between the instances of $x_j$ (a row in matrix A) and the respective cluster centroid, is minimized. In some embodiments of the present invention, Expression (9) works with graph inputs to identify a clustering of vertices on the graph to minimize the edge weights to be "cut" while normalizing for cluster size.

In some embodiments of the present invention, a clustering algorithm uses a set of data descriptors to describe or bound key features of the data set. In some embodiments of the present invention, key features of the data set are relevant to estimate the computational resources required for a data-mining task. In some embodiments of the present invention, a set of data descriptors includes, but is not limited to: (i) the number, n, of features (the dimension) of the training set; (ii) the number, m, of described items in the training set; (iii) in a block structure, the number of blocks; (iv) the k eigenvector condition number, such that $\sigma_k(A)/\sigma_{k+1}(A)$ is used to determine a number of iterations performed; (v) the number of non-zero values in any column or block i of the matrix A, $\|A_{:i}\|_0$, is used to determine the computation cost of the spectral decomposition of matrix A.

Processing terminates at step S470, where estimate mod 520 estimates the computational effort required for the data-mining task based on the data set received in step S455, the set of control values received in step 460, and the set of task parameters received at step S465. In some embodiments of the present invention, estimate mod 520 bases its estimates on the received data set. In some embodiments of the present invention, estimate mod 520 separately identifies the received data set and the set of data descriptors. In some embodiments of the present invention, estimate mod 520 bases its estimates on the set of control values. In some embodiments of the present invention, estimate mod 520 bases its estimates on the set of task parameters. In some embodiments of the present invention, estimate mod 520 estimates the computational effort required to perform a data-mining task over a distributed computing system. In some embodiments of the present invention, the distributed computing system is a node in a cloud computing environment. In some embodiments of the present invention, the distributed computing system includes multiple nodes in a cloud computing environment. In some embodiments of the present invention, estimate mod 520 estimates the processing power required for the data-mining task. In some embodiments of the present invention, estimate mod 520 estimates the memory required for the data-mining task. In some embodiments of the present invention, estimate mod 520 estimates the I/O tasks required for the data-mining task. In some embodiments of the present invention, estimate mod 520 estimates the network tasks required for the data-mining task. In some embodiments of the present invention, estimate mod 520 considers a number of iterations through the data set required to complete the data-mining task. In some embodiments of the present invention, the number of iterations through the data set is a function of a desired accuracy level of the estimation. In some embodiments of the present invention, the number of iterations through the data set (data passes) is a function of the number of computing entities used for processing the estimation algorithm. In some embodiments of the present invention, estimate mod 520 performs the estimate by considering the number of arithmetic operations required in a data pass. In some embodiments of the present invention, an arithmetic operation includes a broadcast operation. In some embodiments of the present invention, a broadcast operation transmits a set of bytes. In some embodiments of the present invention, a broadcast operation transmits a set of bytes in a point-to-point communication. In some embodiments of the present invention, a broadcast operation includes a point-to-point communication.

In some embodiments of the present invention, the estimate produced by estimate mod 520 depends on whether the task parameter indicates a regression task, a classification task, or a clustering task. In some embodiments of the present invention, the estimate produced by estimate mod 520 depends on a loss-function. In some embodiments of the present invention, the loss function is correlated with the task parameter.

In some embodiments of the present invention, estimate mod 520 defines a data-mining task using a job definer. In some embodiments of the present invention a job definer composes a job for processing the data-mining task. In some embodiments of the present invention, a job definer includes a set of logic for selecting a suitable method to process a data-mining task, based, at least in part, on a data set, a set of control values, and a set of task parameters. In some embodiments of the present invention, estimate mod 520 estimates a computational complexity of a data-mining task, based in part on a job definition. In some embodiments of the present invention, a computational complexity of a data-mining task is based in part on a set of cost descriptors. In some embodiments of the present invention, a set of cost descriptors includes information about costs associated with a set of component parts of a data-mining task.

In some embodiments of the present invention, a set of cost descriptors includes, but is not limited to: (i) a number of iterations as a function of a number of machines employed; (ii) a number of data passes across a set of coordinates as a function of a number of machines employed; (iii) an acceptable error probability for an estimate; (iv) a number of arithmetic operations for a data pass as a function of a number of machines employed; (v) a number of broadcast operations per data pass; (vi) a number of bytes transmitted per broadcast operation; (vii) a number of point-to-point communication operations per data pass; and/or (viii) a number of bytes transmitted per point-to-point communication.

Some embodiments of the present invention provide cost descriptors for a set of supervised data-mining tasks. In some embodiments of the present invention, a supervised data-mining task includes a regression task and/or a classification task. In some embodiments of the present invention, a cost per arithmetic operation performed is based, at least in part on a number of iterations and a complexity of a set of iterations. In some embodiments of the present invention, a cost per communication performed is based, at least in part on a number of iterations and a complexity of a set of iterations. In some embodiments of the present invention, a number of iterations is based, at least in part, on a number of data passes and a number of coordinates. In some embodiments of the present invention, a block structure is used and a number of blocks of coordinates is used in place of a number of coordinates.

In some embodiments of the present invention, a probabilistic upper bound for a number of iterations is determined. In some embodiments of the present invention, an iteration counter is calculated. In some embodiments of the present invention, k is an iteration counter. In some embodiments of the present invention, $x_0$ is an initial point. In some embodiments of the present invention, $0<\rho<1$ is a target confidence. In some embodiments of the present invention, $\mathcal{R}_L^2(x_0) = \max_x\{\max_{x^* \in X^*}\|x-x^*\|_L^2 | F(x) \leq F(x_0)\}$. In some embodiments of the present invention, $\epsilon > 0$. In some embodiments of the present invention, $F^* = \max_x F(x)$. In some embodiments of the present invention, a set of constants includes, but is not limited to: a, $\beta$, $\sigma$, s, $\|h\|_L^2$, and/or L.

In some embodiments of the present invention, an iteration counter is determined as:

$$k \geq \frac{2\max\{\beta \mathcal{R}_L^2(x_0), F(x_0) - F^*\}}{\alpha \epsilon}\left(1 + \log\frac{1}{\rho}\right) + 2 \qquad (10)$$

In some embodiments of the present invention, $\in < F(x_0) - F^*$. Alternatively, an iteration counter is determined as:

$$k \geq \frac{2\beta \mathcal{R}_L^2(x_0)}{\alpha \epsilon} \log \frac{F(x_0) - F^*}{\epsilon \rho} \quad (11)$$

In some embodiments of the present invention, $\in < \max\{\beta \mathcal{R}_L^2(x_0), F(x_0) - F^*\}$.

In some embodiments of the present invention, a probabilistic function exists such that for a point, $x_k$, a non-increasing check is applied to a convex function, F. In some embodiments of the present invention a set of parameters $\in$, $\rho$, and L are crucial to determining a number of iterations. In some embodiments of the present invention, a probabilistic function is represented as:

$$\text{Prob}(F(x_k) - F^* \leq \in) \geq 1 - \rho \quad (12)$$

In some embodiments of the present invention, a single iteration is required. In some embodiments of the present invention, a single iteration requires a set of operations, $O(\|A_{:,i}\|_0)$, to determine a cost of a data-mining task. In some embodiments of the present invention, $\|A_{:,i}\|_0$ is the number of non-zero values in column (or block) i of matrix A. In some embodiments of the present invention, the number of operations, O, for the data-mining task is reduced based, at least in part, on an eigenvalue of matrix A. In some embodiments of the present invention, the number of operations is selected from a method including, but not limited to: (i) a single broadcast including a set of C−1 point-to-point messages; (ii) a single broadcast including a set of $2E_1 + E_2$ messages; and/or (iii) zero broadcasts, including a set of C−1 point-to-point messages. In some embodiments of the present invention, the set of C−1 point-to-point messages includes O(Cm) numbers. In some embodiments of the present invention, a data-mining task includes a latency of $c_1$. In some embodiments of the present invention, a data-mining task includes a bandwidth of $c_2$. In some embodiments of the present invention, a training set includes m examples. In some embodiments of the present invention, a broadcast operation has a duration $\log C(c_1 + c_2 m)$. In some embodiments of the present invention, a broadcast operation has a duration $$2 \log C c_1 + 2 c_1 \frac{c-1}{c} m.$$

In some embodiments of the present invention, y (h,V) is a function counting a number of parts in V that h intersects. In some embodiments of the present invention, $E_1$ is O(m). In some embodiments of the present invention, $E_2$ is $O(C^2)$. In some embodiments of the present invention:

$$E_1 := \Sigma_{h \in \mathcal{H}} \{1 : y(h, V) \geq c_1\} \quad (13)$$

In some embodiments of the present invention:

$$E_2 := \Sigma_{c \leq d \leq C} \{1 : \exists h \in \mathcal{H}, y(h, \{V_c, V_d\}) = 2 \wedge y(h, V) < c_1\} \quad (14)$$

In some embodiments of the present invention, using zero broadcasts causes an increase in a number of iterations. In some embodiments of the present invention, the determination of the number of operations is dependent on whether to parallelize computation. In some embodiments of the present invention, parallelization of computation is necessary based on available memory. In some embodiments of the present invention, parallelization of computation is necessary based on a cost of distributing an input. In some embodiments of the present invention, parallelization of computation is necessary based on a set of costs of various properties of a network. In some embodiments of the present invention a set of various properties of a network on which a set of costs is determined includes, but is not limited to: (i) a network latency; (ii) a bandwidth of a set of point-to-point connections; and/or (iii) a price of a broadcast. In some embodiments of the present invention, selection of an algorithm is performed by a data-mining task scheduler.

Some embodiments of the present invention implement single value decomposition (SVD) of Laplacian matrices. In some embodiments of the present invention, a Laplacian matrix is implemented in a clustering algorithm. In some embodiments of the present invention, SVD of a Laplacian matrix is implemented in a clustering algorithm. In some embodiments of the present invention, SVD of a Laplacian matrix involves a set of data descriptors and a set of cost descriptors. In some embodiments of the present invention, SVD of a Laplacian matrix is implemented for an unsupervised data-mining task. In some embodiments of the present invention, SVD of a Laplacian matrix is implemented for a cluster algorithm data-mining task. In some embodiments of the present invention, a normalized graph Laplacian matrix is represented as:

$$L = D^{-1/2} W D^{-1/2} \quad (15)$$

In some embodiments of the present invention, matrix W (also matrix W(i,j)) represents a set of weights connecting vertices i and j. In some embodiments of the present invention, matrix D is a diagonal matrix. In some embodiments of the present invention, matrix D contains a set of degrees of graph nodes D (i, j)=$\Sigma_j W$ (i, j).

In some embodiments of the present invention, the SVD of the normalized Laplacian matrix is rank k. In some embodiments of the present invention, the SVD of the normalized Laplacian matrix is associated with a set of graph clustering objective functions. In some embodiments of the present invention, a set of graph clustering objective functions includes a subset of functions based on random walk models. In some embodiments of the present invention the spectrum of the normalized Laplacian matrix is related to the spectrum of $P = D^{-1} W$. In some embodiments of the present invention, P is a right stochastic matrix. In some embodiments of the present invention, P is a probability transition matrix for matrix W. In some embodiments of the present invention, P is the probability of traversing from node i to node j. In some embodiments of the present invention, the probability of traversing from node i to node j is represented by W (i, j)/D (i, i).

In some embodiments of the present invention, SVD of the normalized Laplacian matrix approximates a clustering objective. In some embodiments of the present invention, SVD of the normalized Laplacian matrix approximates a clustering objective to minimize a probability of traversing between two clusters. In some embodiments of the present invention, a clustering objective is represented as:

$$\text{Obj} = P[A \to B | A] + P[B \to A | B] \quad (16)$$

In some embodiments of the present invention, $P_{ij}$ represents an element of a probability transition matrix, P. In some embodiments of the present invention, the probability transition matrix is represented as:

$$P[AB | A] = \frac{\sum_{i \in A, j \in B} \pi_i^\infty P_{ij}}{\pi^\infty(A)} \quad (17)$$

In some embodiments of the present invention $\pi_i^\infty$ represents a stationary distribution of a node i. In some embodiments of the present invention, $\pi_i^\infty$ is based, at least in part, on a probability transition matrix P. In some embodiments of the present invention, $\pi^\infty(A)$ represents a sum of a set of stationary distributions of a set of nodes in cluster A. In some embodiments of the present invention, a clustering objective is equivalent to a normalized cut clustering. In some embodiments of the present invention, a clustering objective is written as an equivalent form of a Trace optimization. In some embodiments of the present invention, a random walk model is associated with a modified version of an SVD of a normalized Laplacian matrix.

In some embodiments of the present invention, a set of data descriptors are derived from an eigenvalue distribution of a Laplacian matrix. In some embodiments of the present invention, an eigenvalue distribution of a Laplacian matrix is related to a cost descriptor. In some embodiments of the present invention, a cost descriptor is correlated with a required memory and to determine a number of data-passes required for a data-mining task. In some embodiments of the present invention, a set of data passes are required due to the size of a set of input data. In some embodiments of the present invention, a set of input data does not fit in a memory. In some embodiments of the present invention, computations involving an input matrix read a set of data from a disk. In some embodiments of the present invention, a compressed version of an input matrix fits in a memory. In some embodiments of the present invention, a compressed version of an input matrix is associated with a required memory cost. In some embodiments of the present invention, a set of eigenvalue-computations are well-conditioned. In some embodiments of the present invention, a set of eigenvector computations depends on an eigenvalue distribution of a matrix. In some embodiments of the present invention, estimate mod 520 estimates an eigenvalue distribution. In some embodiments of the present invention, estimate mod 520 estimates a cost descriptor to compute an SVD of a matrix. In some embodiments of the present invention, an eigenvalue distribution is derived by a data-descriptor extractor. In some embodiments of the present invention, a data-descriptor extractor provides a method for estimating a set of data descriptors for a data set.

In some embodiments of the present invention, a cost descriptor for a clustering data-mining task is a required memory. In some embodiments of the present invention, an association between an eigenvalue distribution and a cost descriptor indicating the required memory size is created. In some embodiments of the present invention, a required memory to compute an SVD of a matrix is determined by the size of a random Gaussian matrix, $R_G$. In some embodiments of the present invention, an association between an eigenvalue distribution and a cost descriptor is represented as:

$$E\|L - \hat{L}_k\|_F \le \left(1 + \frac{k}{p-1}\right)^{1/2}\left(\sum_{j>k} \sigma_j^2\right)^{1/2} \quad (18)$$

In some embodiments of the present invention, the random Gaussian matrix, $R_G$, has dimensions n×(k+p). In some embodiments of the present invention, L represents a Laplacian matrix. In some embodiments of the present invention, $\hat{L}_k$ represents a rank-k approcpination of a Laplacian matrix. In some embodiments of the present invention, a set of expected value bounds provide an average approximation of errors. In some embodiments of the present invention, a set of tail bounds are included. In some embodiments of the present invention, a set of errors do not have a high variance. In some embodiments of the present invention, a set of bounds represent a behavior of a clustering algorithm. In some embodiments of the present invention, a set bounds are determined with two data passes. In some embodiments of the present invention, a set of bounds associates a memory usage with a quality bound of an SVD approximation.

In some embodiments of the present invention, a number of data passes is used to determine a set of approximation bounds. In some embodiments of the present invention, a set of approximation bounds is used to determine a relationship between an eigenvalue distribution and a number of data passes. In some embodiments of the present invention, an eigenvalue distribution is a data descriptor. In some embodiments of the present invention, a number of data passes is a cost descriptor. In some embodiments of the present invention, a number of data passes is inversely related to a quality of an approximation. In some embodiments of the present invention, a tradeoff exists between a number of data passes and a quality of an approximation. In some embodiments of the present invention, an approximation bound is represented as:

$$E\|L - \hat{L}_k\|_F \le \left[\left(1 + \sqrt{\frac{k}{p-1}}\right)\sigma_{k+1}^{2q+1} + \frac{\sqrt[q]{k+p}}{p}\left(\sum_{j>k}\sigma_j^{2(2q+1)}\right)^{1/2}\right]^{1/(2q+1)} \quad (19)$$

In some embodiments of the present invention, k+p represents the size of the random Gaussian matrix, $R_G$. In some embodiments of the present invention, k+p represents a set of memory usage requirements. In some embodiments of the present invention, 2q+1 represents a number of data passes. In some embodiments of the present invention, an end-user is unaware of an eigenvalue distribution of a data set. In some embodiments of the present invention, an end-user does not have an estimate of an eigenvalue distribution of a data set. In some embodiments of the present invention, estimate mod 520 approximates an eigenvalue distribution of a data set.

Figure 6:
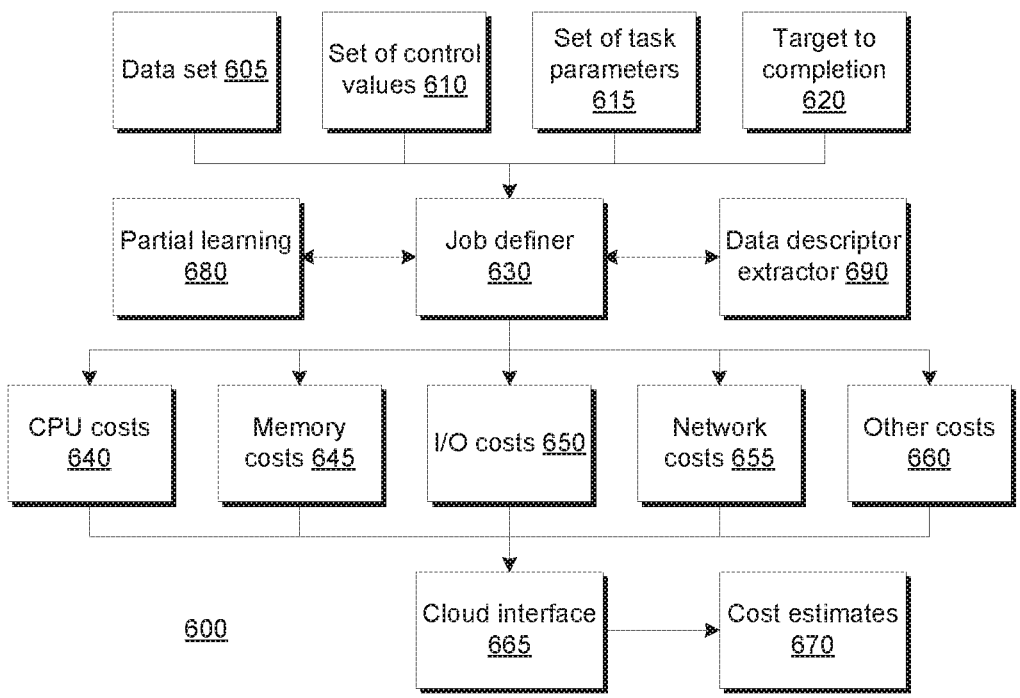
FIG. 6 depicts a data-mining environment according to a second embodiment of the present invention.

FIG. 6 depicts data-mining environment 600. Data-mining environment 600 includes: data set 605; set of control values 610; set of task parameters 615; target to completion 620; job definer 630; CPU costs 640; memory costs 645; I/O costs 650; network costs 655; other costs 660; cloud interface 665; cost estimates 670; partial learning 680; and data descriptor extractor 690. In some embodiments of the present invention, one or more objects in data-mining environment are not implemented; for example, in some embodiments of the present invention, data descriptor extractor 690 is not implemented because data set 605 does not contain a set of data descriptors. In some embodiments of the present invention, one or more objects depicted in data-mining environment 600 are omitted; for example, in some embodiments of the present invention, a supervised data-mining task is implemented and partial learning 680 is not necessary and is omitted.

In some embodiments of the present invention, data set 605, set of control values 610, set of task parameters 615, and/or target to completion 620 are provided to job definer 630 as a set of inputs. In some embodiments of the present invention, data set 605 includes a set of data descriptors. In some embodiments of the present invention, set of control values 610 includes a desired accuracy. In some embodiments of the present invention, set of task parameters 615 includes an algorithm classifier. In some embodiments of the present invention, target to completion 620 includes a time period in which to complete a data-mining task. In some embodiments of the present invention, a set of inputs in data-mining environment 600 are represented as a single object. In some embodiments of the present invention, job definer 630 determines a data-mining task to be performed. In some embodiments of the present invention, job definer 630 includes a set of logic to specify a data-mining task. In some embodiments of the present invention, a data-mining task is based, at least in part, on the set of inputs received by job definer 630. In some embodiments of the present invention, job definer 630 selects an algorithm to complete a data-mining task. In some embodiments of the present invention, job definer 630 is adapted to select an algorithm based on a convergence behavior. In some embodiments of the present invention, a set of algorithms for a data-mining task converge at different rates. In some embodiments of the present invention, selection of an algorithm is a separate object within data-mining environment 600.

In some embodiments of the present invention, partial learning 680 is an algorithm to improve a cost estimate. In some embodiments of the present invention, partial learning 680 receives information from job definer 630. In some embodiments of the present invention, partial learning 680 analyzes a set of prior cost estimates for prior data-mining tasks. In some embodiments of the present invention, partial learning 680 analyzes a set of actual costs for prior data-mining tasks. In some embodiments of the present invention, partial learning 680 determines a set of overestimates and a set of underestimates based on a set of prior data-mining tasks. In some embodiments of the present invention, partial learning 680 determines a set of discrepancies for a set of different cost breakdowns. In some embodiments of the present invention, partial learning 680 provides a set of scaling factors for a set of different cost breakdowns. In some embodiments of the present invention, a set of scaling factors provided by partial learning 680 are incorporated into a set of future cost estimates by job definer 630. In some embodiments of the present invention, partial learning 680 builds on prior cost estimates for prior data-mining tasks to improve a current cost estimate. In some embodiments of the present invention, partial learning 680 refines a set of estimation parameters based, at least in part, on prior cost estimates.

In some embodiments of the present invention, data descriptor extractor 690 extracts a set of data descriptors from a data set. In some embodiments of the present invention, additional computational costs are incurred by data descriptor extractor 690. In some embodiments of the present invention, an estimate of additional computational costs incurred by data descriptor extractor 690 is required. In some embodiments of the present invention, data descriptor extractor 690 includes an algorithm to estimate a set of data descriptors in a data set. In some embodiments of the present invention, a data set includes only a set of data descriptors. In some embodiments of the present invention, a set of data descriptors are used to estimate a computational cost based, at least in part, on a complexity of the set of data descriptors.

In some embodiments of the present invention, a set of costs are estimated based, at least in part, on a selected algorithm. In some embodiments of the present invention, a set of costs estimation objects are represented as a single object within data-mining environment 600. In some embodiments of the present invention, a set of costs are broken down based on usage area. In some embodiments of the present invention, costs are separated into one of the following categories: (i) CPU costs 640; (ii) memory costs 645; (iii) I/O costs 650; (iv) network costs 655; and/or (v) other costs 660. In some embodiments of the present invention, one or more costs are combined into a single object. In some embodiments of the present invention, a cost estimate is estimated based, at least in part, on an algorithm received from job definer 630. In some embodiments of the present invention, a cost object bases an estimate on a set of data descriptors from data set 605.

In some embodiments of the present invention, cloud interface 665 interacts with a set of cloud service providers. In some embodiments of the present invention, cloud interface 665 interacts with an application programming interface (API) for a cloud server. In some embodiments of the present invention, cloud interface 665 is an API for a cloud server. In some embodiments of the present invention, a cloud service provider estimates a cloud cost for a data-mining task. In some embodiments of the present invention, cloud interface 665 estimates a cloud cost for a data-mining task. In some embodiments of the present invention, cloud interface 665 bases the estimate, at least in part, on one or more of: (i) data set 605; (ii) set of control values 610; (iii) set of task parameters 615; and/or (iv) target to completion 620.

In some embodiments of the present invention, cost estimates 670 compiles a set of costs from data-mining environment 600. In some embodiments of the present invention, cost estimates 670 determines a final cost for a data-mining task.

Figure 7:
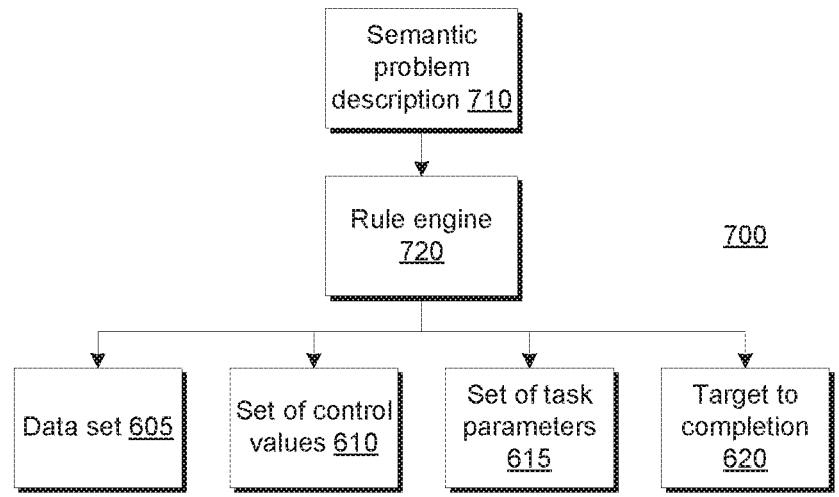
FIG. 7 depicts a data-mining environment according to a third embodiment of the present invention.

FIG. 7 depicts data-mining environment 700. In some embodiments of the present invention, data-mining environment 700 includes optional objects that are implemented with data-mining environment 600. Data-mining environment 700 includes: data set 605; set of control values 610; set of task parameters 615; target to completion 620; semantic problem description 710; and rule engine 720.

In some embodiments of the present invention, data-mining environment 700 provides additional input for data-mining environment 600. In some embodiments of the present invention, semantic problem description 710 is received as an input. In some embodiments of the present invention, semantic problem description 710 is a plain language description of a data-mining task. In some embodiments of the present invention, semantic problem description 710 is provided by a user. In some embodiments of the present invention, semantic problem description 710 provides a high-level description of a data-mining task.

In some embodiments of the present invention, rule engine 720 specifies a set of requirements for a data-mining task. In some embodiments of the present invention, rule engine 720 determines a set of requirements for other inputs. In some embodiments of the present invention, rule engine 720 converts semantic problem description 710 to a format understandable by data-mining environment 600. In some embodiments of the present invention, rule engine 720 includes a set of frequent parameters. In some embodiments of the present invention, data-mining environment 700 increases ease of user interaction with data-mining environment 600.

Figure 8:
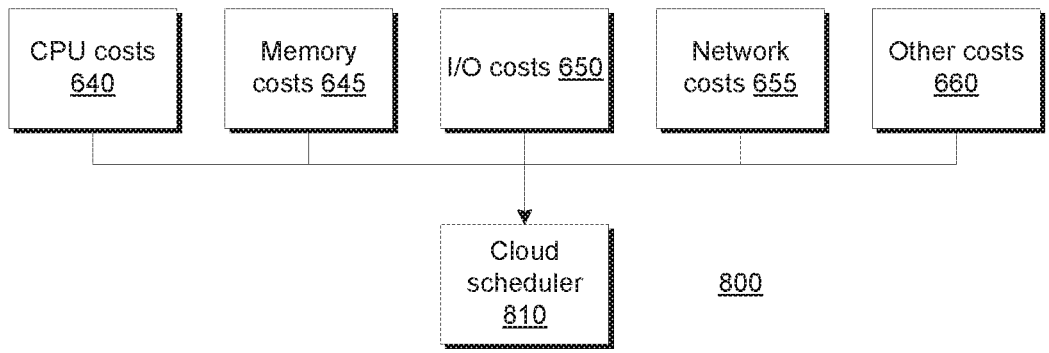
FIG. 8 depicts a data-mining environment according to a fourth embodiment of the present invention.

FIG. 8 depicts data-mining environment 800. In some embodiments of the present invention, data-mining environment 800 includes optional objects that are implemented with data-mining environment 600. Data-mining environment 800 includes: CPU costs 640; memory costs 645; I/O costs 650; network costs 655; other costs 660; cloud scheduler 810; minimal cost estimates 820; and optimal deployment strategy 830.

In some embodiments of the present invention, cloud scheduler 810 receives a set of information from one or more of: CPU costs 640; memory costs 645; I/O costs 650; network costs 655; and/or other costs 660. In some embodiments of the present invention, cloud scheduler 810 provides a set of processing packages for a data-mining task. In some embodiments of the present invention, a set of processing packages is based, at least in part, on a set of requirements of a data-mining task. In some embodiments of the present invention, a set of requirements of a data-mining task include, but are not limited to: (i) a CPU power requirement; (ii) an I/O device load; and/or (iii) a network load. In some embodiments of the present invention, cloud scheduler 810 provides a subset of processing packages that are not viable. In some embodiments of the present invention, cloud scheduler 810 provides a subset of processing packages that are viable. In some embodiments of the present invention, cloud scheduler 810 selects a processing package from a subset of processing packages that are viable. In some embodiments of the present invention, cloud scheduler 810 selects a processing package based, at least in part, on a set of control variables. In some embodiments of the present invention, cloud scheduler 810 receives a processing package as an input.

Figure 9:
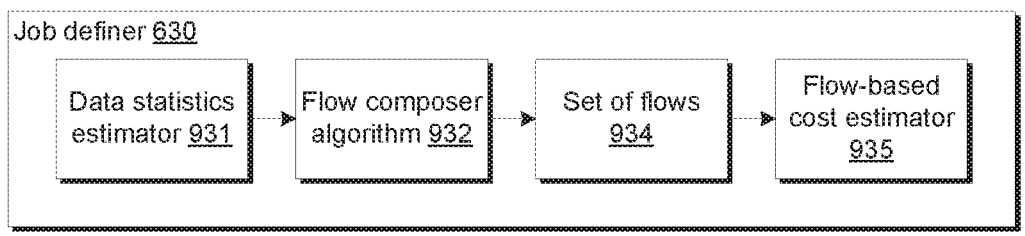
FIG. 9 depicts a data-mining environment according to a fifth embodiment of the present invention.

FIG. 9 depicts an example breakdown of job definer 230 into a set of constituent objects. Job definer 230 includes: data statistics estimator 931; flow composer algorithm 932; set of flows 934; and flow-based cost estimator 935.

In some embodiments of the present invention, data statistics estimator 931 interacts with other objects in data-mining environment 600. In some embodiments of the present invention, data statistics estimator 931 receives a set of information from one or more of: data set 605; set of control values 610; set of task parameters 615; and/or target to completion 620. In some embodiments of the present invention, data statistics estimator 931 receives information from partial learning 680 and/or data descriptor extractor 690. In some embodiments of the present invention, data statistics estimator 931 sends information to partial learning 680 and/or data descriptor extractor 690. In some embodiments of the present invention data statistics estimator 931 estimates a set of properties associated with a data set. In some embodiments of the present invention, a set of properties associated with a data set includes, but is not limited to: (i) a sparseness of data values; (ii) an independence of data; (iii) a set of eigenvectors; and/or (iv) a number of non-zero data values. In some embodiments of the present invention, a set of properties associated with a data set is correlated with a computational effort required for a data-mining task. In some embodiments of the present invention, data statistics estimator 931 improves a cost estimation.

In some embodiments of the present invention, flow composer algorithm 932 receives information from data statistics estimator 931. In some embodiments of the present invention, develops a set of flows to perform a data-mining process. In some embodiments of the present invention, different data-mining tasks require a different number of flows. In some embodiments of the present invention, different flows use different algorithms to estimate a set of costs. In some embodiments of the present invention, different flows use different data descriptors to estimate a set of costs.

In some embodiments of the present invention, set of flows 934 includes one or more flows to determine aspects of a data-mining task. In some embodiments of the present invention, a number of flows included in set of flows 934 is determined by flow composer algorithm 932. In some embodiments of the present invention, different flows in set of flows 934 determine different aspects of a data-mining task. In some embodiments of the present invention, a plurality of flows included in set of flows 934 use a single algorithm to determine a single aspect of a data-mining task. In some embodiments of the present invention, set of flows 934 determines a set of cost estimates. In some embodiments of the present invention, set of flows 934 determines a set of component values making up a set of cost estimates. In some embodiments of the present invention, different flows in set of flows 934 analyze algorithms for different methods of completing a data-mining task. In some embodiments of the present invention, different flows in set of flows 934 analyze algorithms associated with different parts of a data-mining task. In some embodiments of the present invention, set of flows 934 analyzes a data set with a set of control variable. In some embodiments of the present invention, set of flows 934 analyzes a set of control variables at different values. In some embodiments of the present invention, set of flows 934 varies a processing speed and/or an accuracy.

In some embodiments of the present invention, flow-based cost estimator 935 receives a set of values from set of flows 934. In some embodiments of the present invention, flow-based cost estimator 935 estimates a cost associated with a data-mining task. In some embodiments of the present invention, flow-based cost estimator 935 selects an algorithm, based in part on a value provided by set of flows 934. In some embodiments of the present invention, flow-based cost estimator 935 determines a set of costs for a data-mining task based on a set of algorithms. In some embodiments of the present invention, flow-based cost estimator 935 selects an algorithm based on a lowest cost. In some embodiments of the present invention, flow-based cost estimator 935 provides a graphical display of a set of values received from set of flows 934. In some embodiments of the present invention, flow-based cost estimator 935 provides information to cloud interface 665. In some embodiments of the present invention, CPU costs 640, memory costs 645, I/O costs 650, network costs 655, and/or other costs 660 are included in job definer 630. In some embodiments of the present invention, CPU costs 640, memory costs 645, I/O costs 650, network costs 655, and/or other costs 660 are omitted.

Some embodiments of the present invention estimate a set if costs of associated with a data-mining algorithm run on a cloud infrastructure. Some embodiments of the present invention may include one, or more, of the following features, characteristics, and/or advantages: (i) an algorithmic job definer estimating system requirements for running a data-mining task over a data set with result targets; (ii) a data descriptor tool that can be used to interact with the user in order to further specify the properties of the targeted input data set; (iii) a partial learning tool that can be used to estimate system requirements through runs on sub-sample of the target data; and/or (iv) a cost feedback UI presenting the result of the cost evaluation to the end-user or inquiring application.

Some embodiments of the present invention may include one, or more, of the following features, characteristics, and/or advantages: (i) extracting system requirements to perform a data-mining task over a target data set; pricing the cost of deploying such data-mining task over a cloud infrastructure; (ii) estimating the cost of performing a data-mining task using partial learning or data descriptors; and/or (iii) creating a set of estimates at different levels of quality or accuracy, dependent on system requirements.

Some embodiments of the present invention involve provision of "data-mining as a service." In some embodiments of the present invention, "data-mining as a service" is a cloud-based service. Some embodiments of the present invention bridge a gap between a data-mining task and a computational effort required to perform the data-mining task. In some embodiments of the present invention, a cost estimate for a data-mining task is provided, based, at least in part, on an estimation of a set of computational resources required to perform the data-mining task. In some embodiments of the present invention, a cost estimate for a data-mining task is defined in terms of a set of computational tasks. In some embodiments of the present invention, a cost estimate for a data-mining task is defined in terms of a set computational resources to be used.

In some embodiments of the present invention, a set of costs is estimated by deriving a set of cost descriptors. In some embodiments of the present invention, a set of cost descriptors includes, but is not limited to, a set of information about a number of iterations to compute a data-mining task. In some embodiments of the present invention, a set of cost descriptors includes a set of information about a complexity of a set of operations performed per iteration. In some embodiments of the present invention, a number of iterations is a number of data passes across all coordinates. In some embodiments of the present invention, a number of iterations depends on a number of computing entities executing a data-mining task. In some embodiments of the present invention, a number of iterations depends on a desired accuracy. In some embodiments of the present invention, a set of information regarding a complexity of a set of operations per iteration is a number of arithmetic operations performed during a data pass. In some embodiments of the present invention, a number of arithmetic operations performed during a data pass is a function of a number of computing entities executing a data-mining task. In some embodiments of the present invention, a set of cost descriptors includes a set of information about a number of broadcast operations performed per data pass. In some embodiments of the present invention, a set of cost descriptors includes a set of information about a number of bytes being transmitted in a broadcast operation. In some embodiments of the present invention, a set of cost descriptors includes a set of information about a number of point-to-point communication operations performed during a data pass. In some embodiments of the present invention, a set of cost descriptors includes a set of information about a number of bytes transmitted in a communication operation. Some embodiments of the present invention employ segmentation of a data-mining task into multiple blocks (e.g., CPU cost, memory cost, I/O cost, network cost). In some embodiments of the present invention, segmentation of a data-mining task into multiple blocks aids in determining a computational complexity of a data-mining task. In some embodiments of the present invention, determining a computational complexity of a data-mining task improves an estimation of a computational effort. In some embodiments of the present invention, improving an estimation of a computational effort improves an estimation of a costs of a data-mining task.

In some embodiments of the present invention, a set of control values includes a desired accuracy. In some embodiments of the present invention, a set of control values includes a desired duration to compute a computational resource estimation. In some embodiments of the present invention, a set of control values influences a computational effort of a data-mining task. In some embodiments of the present invention, an estimation accuracy is linked to a number of iterations performed on a data set to obtain a desired accuracy. In some embodiments of the present invention, a computing duration influences a number of employed computing entities. In some embodiments of the present invention, a set of control values includes a start time and/or an end time for a data-mining task. In some embodiments of the present invention, a start time and/or an end time for a data-mining task influences a task cost. In some embodiments of the present invention, data center loads vary by time of day. In some embodiments of the present invention, costs for computing entities are reduced during times of reduced data center load. In some embodiments of the present invention, a subset of a set of control values impacts an estimation result.

In some embodiments of the present invention, a task parameter includes an algorithm classifier. In some embodiments of the present invention, an algorithm classifier defines a type of data-mining task to be performed. In some embodiments of the present invention, an algorithm classifier stores a classification of a data-mining task as an element of data. In some embodiments of the present invention, a classification indicates that a data-mining task is one of: a regression task; a classification task; or a clustering task.

In some embodiments of the present invention, a loss function type is received if a data-mining task is classified as regression task. In some embodiments of the present invention, a loss function type is received if a data-mining task is classified as classification task. In some embodiments of the present invention, a loss function measures a similarity of a given data set to a predicted data. In some embodiments of the present invention, a goal of a data-mining process is to minimize a loss function. In some embodiments of the present invention, minimizing a loss function reduces an estimation error. In some embodiments of the present invention, minimizing a loss function improves an estimation accuracy. In some embodiments of the present invention, a loss function type indicates a loss function as one of: a square loss function; a logarithmic loss function; or a hinge square loss function.

In some embodiments of the present invention, a regularization function is received. In some embodiments of the present invention, a regularization function provides a set of additional information for an estimation process. In some embodiments of the present invention, a set of additional information improves an ability to solve an ill-posed problem. In some embodiments of the present invention, a set of additional information improves an ability to prevent overfitting. In some embodiments of the present invention, a set of additional information improves an ability to incorporate domain knowledge. In some embodiments of the present invention, an $L_0$ norm is used to interpret a sparse data set. In some embodiments of the present invention, an $L_1$ norm is used to interpret a sparse data set. In some embodiments of the present invention, an estimation accuracy is increased by penalizing a subset of data values. In some embodiments of the present invention, a subset of data values is penalized by a regularization function.

In some embodiments of the present invention, a clustering function (similarity function) is received for a clustering data-mining task. In some embodiments of the present invention, a clustering function provides a cost to partition a set of data into multiple data clusters. In some embodiments of the present invention, a clustering function provides a cost to include a subset of elements in a cluster. In some embodiments of the present invention, a clustering function provides a cost to cluster a subset of elements within a list of designated subsets of elements. In some embodiments of the present invention, a clustering function (similarity function) is a k-means function. In some embodiments of the present invention, a clustering function (similarity function) is a normalized cut function. In some embodiments of the present invention, a set of data is grouped (clustered) such that an intra-group (intra-cluster) similarity is greater than an inter-group (inter-cluster) similarity.

In some embodiments of the present invention, a set of data descriptors associated with a data set are received. In some embodiments of the present invention, a set of data descriptors includes a set of properties defining characteristics of a data set. In some embodiments of the present invention, a set of properties defining characteristics of a data set influences a computational effort of a data-mining task. In some embodiments of the present invention, a set of data descriptors includes, but is not limited to: (i) a number of features (dimension) of a data set; (ii) a number of described items in a data set; (iii) for a data set with a block structure, a number of blocks in the data set; (iv) a degree of partial separability of a loss function (e.g., a k-cut function in a hypergraph); (v) a square of a largest eigenvalue, $L=\sigma_{max}^2(A)$; (vi) a condition number $\sigma_{max}(A)/\sigma_{min}(A)$; (vii) a set of other properties of a spectrum of an item-feature matrix; and/or (viii) a maximum number of non-zero values in a column or block of a matrix. In some embodiments of the present invention, a condition number is used to determine a number of iterations to be performed.

In some embodiments of the present invention, an algorithm is selected from a set of algorithms for estimating a computational effort of a data-mining task. In some embodiments of the present invention, selection of an algorithm is based on a data set. In some embodiments of the present invention, selection of an algorithm is based on a set of data descriptors. In some embodiments of the present invention, selection of an algorithm is based on a set of control values. In some embodiments of the present invention, selection of an algorithm is based on a set of task parameters. In some embodiments of the present invention, selection of an algorithm is based on an assessment of a set of computational criteria of a data-mining task. In some embodiments of the present invention, an algorithm is selected based, at least in part, on a set of input parameters. In some embodiments of the present invention, a set of logic is provided for selecting an algorithm. In some embodiments of the present invention, a set of logic is adapted to choose a most appropriate algorithm for solving a data-mining task. In some embodiments of the present invention, an algorithm selection is automated. In some embodiments of the present invention, automating an algorithm selection enhances a user-friendliness of a data-mining task.

Some embodiments of the present invention include one or more of the following features: (i) providing information regarding a set of computational resources required to perform a data-mining task; (ii) providing information regarding a set of control values to a deployment scheduler; (iii) employing a said deployment scheduler that includes a set of information about a plurality of distributed computing systems; (iv) selecting a set of distributed computing systems based on a set of computational resource information; (v) selecting a set of distributed computing systems based on a set of control values; and/or (vi) returning a set of information regarding a cost to deploy a data-mining task on a distributed computing system.

In some embodiments of the present invention, a deployment scheduler investigates a suitable deployment strategy for performing a data-mining task. In some embodiments of the present invention, a distributed computing system (a cloud environment) is selected to ensure processing of a data-mining task at a lowest cost. In some embodiments of the present invention, a distributed computing system is selected to ensure a fastest processing of a data-mining task. In some embodiments of the present invention, a distributed computing system is selected to ensure a desired security for processing of a data-mining task. In some embodiments of the present invention, information about the selection of a distributed computing system is displayed on a graphical user interface.

Some embodiments of the present invention include one or more of the following features: (i) receiving a high-level task description of a data-mining task; (ii) deriving a set of parameters of a data-mining task based on a high-level task description using a task definition application; and/or (iii) estimating a set of computational resources required to perform a data-mining task based, at least in part, on a set of parameters.

In some embodiments of the present invention, an interface is provided to increase a usability of a data-mining task. In some embodiments of the present invention, an interface is adapted to receive a high-level description of a data-mining task in a user-friendly syntax. In some embodiments of the present invention data-mining task is refined based on a high-level description of the data-mining task. In some embodiments of the present invention, refining of a data-mining task includes one or more of: (i) selecting a data-mining algorithms; (ii) pre-processing a data set; (iii) deriving a set of data descriptors; and/or (iv) deriving a set of cost descriptors. In some embodiments of the present invention, results of a refining process are inputs to an estimate of computational resources required for a data-mining task. In some embodiments of the present invention, results of a refining process are inputs to an estimate of computational costs required for a data-mining task. In some embodiments of the present invention, automating a refining process enhances a user-friendliness of a data-mining task.

Some embodiments of the present invention provide for an estimate of the computational resources for running a data-mining task. Some embodiments of the present invention are freely combined with one another each other if they are not mutually exclusive.

Some embodiments of the present invention provide for estimates of computational resources for running a data-mining task over a distributed computing system. Some embodiments of the present invention provide for estimates of computational resources for running a data-mining task over a cloud computing environment. Some embodiments of the present invention includes one or more steps, including, but not limited to: (i) receiving a data set, based on which the data-mining task is performed an/or data descriptors describing or bounding features of the data set relevant for estimating computational resources for running the data-mining task; (ii) receiving one or more control values for said data-mining task; (iii) receiving one or more task parameters, said task parameters defining the data-mining task to be performed on said dataset; and/or (iv) estimating the computational resources for performing the data-mining task over the distributed computing system based on the received data set or the received data descriptors, the one or more control values and the one or more task parameters.

The actual workflow of embodiments of the present invention need not follow the sequence of steps above or listed herein. In some embodiments of the present invention, a set of task parameters is a first input; a data set is a second input; and a set of control values is a third input; then an estimate is created.

Some embodiments of the present invention recognize the following facts, potential problems, and/or potential areas for improvement with respect to the current state of the art: (i) data-mining tasks employ non-trivial, iterative algorithms; and/or (ii) resource consumption for cost estimates is an additional variable.

Some embodiments of the present invention include one or more of the following features related to a computer-implemented method to estimate computational resources for running a data-mining task over a distributed computing system: (i) providing a set of control variables (accuracy, time to completion, other) for data-mining tasks, the control variables affecting amount of computational resources needed for the data-mining tasks; (ii) receiving a description of the data-mining task to be performed indicating a data set, a task to be performed on that dataset and possible additional variables from a user; (iii) receiving data descriptors for the data set, the data descriptors describing or bounding key features of the dataset relevant for estimating the computational resources for data-mining tasks; (iv) defining a job performing the data-mining task and estimating computational resources for performing that task over the distributed computing system, based on the data-mining tasks, and dimensions and availability of the distributed computing system, as a function of the data descriptors and control variables; and/or (v) presenting the estimated computational resources to the user in function of control variables.

Some embodiments of the present invention relates to the pricing of data-mining tasks in the cloud. Some embodiments of the present invention bridge a gap between infrastructure costs for a cloud provider and accuracy results for a customer. Some embodiments of the present invention include one or more of the following features: (i) enabling automated price setting for performance of a set of data-mining tasks over a cloud infrastructure; (ii) estimating a set of system resources and hardware resources required to perform a data-mining job suite with a target accuracy, time to completion, or other data-mining related requirements; (iii) estimating and/or improving estimates of costs associated with running a data-mining job-suite; and/or (iv) setting and publishing estimated prices to a prospective customer.

Some embodiments of the present invention include one or more of the following features: (i) asking a user for a description of a data-mining task; (ii) producing a set of execution plans for performing a data-mining task and a set of estimated cost metrics for each execution plan; (iii) asking a user for clarifications on a data set or a target task; (iv) extracting further data descriptors (which describe key features of the targeted data set) that affect a set of cost descriptors; (v) presenting a set of costs to a user as a function of a set of data-mining parameters; (vi) receiving a set of high-level tags describing a target application; (vii) suggesting a set of requirements for a data-mining task; (viii) offering a set of packages depending on system and availability requirements of a target application; (ix) selecting a package and deployment strategy to deploy the targeted data-mining task; (x) presenting a user with a set of costs and deployment strategies.

Possible combinations of features described above can be the following items:

1. A computer-implemented method for estimating computational resources for running a data-mining task over a distributed computing system, the method comprising: (i) receiving a data set, based on which the data-mining task is performed and/or data descriptors describing or bounding features of the data set relevant for estimating computational resources for running the data-mining task; (ii) receiving one or more control values for said data-mining task; (iii) receiving one or more task parameters, said task parameters defining the data-mining task to be performed on said dataset; and (iv) estimating the computational resources for performing the data-mining task over the distributed computing system based on the received data set or the received data descriptors, the one or more control values and the one or more task parameters.

2. The computer-implemented method of item 1, the method further comprising: estimating costs of the data-mining task based on the estimated computational resources required for performing the data-mining task.

3. The computer-implemented method of item 2, the method estimating the costs by deriving cost descriptors, said cost descriptors at least including information regarding the number of iterations required for computing the data-mining task and information regarding the complexity of operations per each iteration.

4. The computer-implemented method of item 2 or 3, the method further comprising: providing a set of cost data based on a value range of one or more control variables, said set of cost data comprising multiple cost values being associated with certain values of said one or more control variables.

5. The computer-implemented method of anyone of the preceding items, the one or more control values being the desired accuracy of estimating the computational resources and/or the duration for computing the computational resource estimation.

6. The computer-implemented method of anyone of the preceding items, the task parameter comprising an algorithm classifier, said algorithm classifier defining the type of data-mining task to be performed on the data.

7. The computer-implemented method of item 6, the algorithm classifier classifying the data-mining task as being a regression task, classification task or clustering task.

8. The computer-implemented method of item 7, the method further receiving a loss function type in case of a regression task or classification task.

9. The computer-implemented method of item 8, the method further receiving a regularization function.

10. The computer-implemented method of item 7, the method further receiving a clustering or similarity function in case of a clustering task, said clustering or similarity function evaluating a partitioning of data included in the data set into multiple data clusters.

11. The computer-implemented method of anyone of the preceding items, the method further receiving one or more data properties associated with the data included in the data set, said data properties defining characteristics of the data influencing the computational effort of running the data-mining task.

12. The computer-implemented method of anyone of the preceding items, the method further providing: extracting one or more data descriptors out of the data set by applying an data descriptor extracting algorithm on the data set.

13. The computer-implemented method of anyone of the preceding items, the method further providing: selecting an algorithm out of a plurality of algorithms for estimating the computational effort of the data-mining task based on the received data set and/or the received data descriptors, the one or more control values and the one or more task parameters by assessing computational criteria of the data-mining task.

14. The computer-implemented method of anyone of the preceding items, the method further comprising: (i) providing information regarding the computational resources required for performing the data-mining task and one or more control values to a deployment scheduler, said deployment scheduler comprising information regarding a plurality of distributed computing systems being adapted to perform data-mining tasks; (ii) selecting one or more distributed computing systems based on the computational resource information and the one or more control values; and (iii) returning information regarding the costs of deploying the data-mining task on a certain distributed computing system.

15. The computer-implemented method of item 14, the method further returning information regarding a deployment strategy for processing the data-mining task on a certain distributed computing system.

16. The computer-implemented method of anyone of the preceding items 2 to 15, the method further comprising: (i) receiving feedback information comprising information regarding previously performed cost estimations of data-mining tasks and real costs occurred when deploying said data-mining task; and (ii) refining the cost estimation of a current data-mining task by using said feedback information.

17. The computer-implemented method of anyone of the preceding items, the method further comprising: (i) calculating multiple process flows for processing the data-mining task; (ii) estimating for each process flow the computational effort for processing the data-mining task; (iii) estimating for each process flow the costs for processing the data-mining task on a distributed computing system; and (iv) presenting the user with the multiple process flow costs or choosing the process flow with the lowest costs for processing the data-mining task.

18. The computer-implemented method of anyone of the preceding items, the method further comprising: (i) receiving a high-level task description of the data-mining task to be performed; (ii) deriving parameters of the data-mining task based on said high-level task description by using a task definition application; and (iii) estimating the computational resources for performing the data-mining task based on said parameters provided by the task definition application.

19. The computer-implemented method of item 18, the task definition application deriving parameters indicating one or more suitable data-mining algorithms, one or more data descriptors and/or one or more cost descriptors.

20. A computer program product for estimating computational resources for running a data-mining task over a distributed computing system, the computer program product comprising a computer readable storage medium having program instructions embodied therewith, the program instructions executable by a processor to cause the processor to execute the method comprising: (i) receiving a data set, based on which the data-mining task is performed and/or data descriptors describing or bounding features of the data set relevant for estimating computational resources for running the data-mining task; (ii) receiving one or more control values for said data-mining task; (iii) receiving one or more task parameters, said task parameters defining the data-mining task to be performed on said dataset; (iv) estimating the computational resources for performing the data-mining task over the distributed computing system based on the received data set or the received data descriptors, the one or more control values and the one or more task parameters.

21. A computer-implemented method for estimating computational resources for running a data-mining task over a distributed computing system, the method comprising: (i) receiving a high level task description of the data-mining task to be performed; (ii) receiving one or more control values for said data-mining task; (iii) executing a task definition application, said task definition application providing parameters for the data-mining task based on the a high level task description of the data-mining task to be performed; and (iv) estimating the computational resources for performing the data-mining task over the distributed computing system based on said parameters and the one or more control values.

22. The computer-implemented method of item 21, the method further comprising: estimating costs of the data-mining task based on the estimated computational resources required for performing the data-mining task.

23. The computer-implemented method of item 22, the method estimating the costs by deriving cost descriptors, said cost descriptors at least including information regarding the number of iterations required for computing the data-mining task and information regarding the complexity of operations per each iteration.

24. A computer program product for estimating computational resources for running a data-mining task over a distributed computing system, the computer program product comprising a computer readable storage medium having program instructions embodied therewith, the program instructions executable by a processor to cause the processor to execute the method comprising: (i) receiving a high level task description of the data-mining task to be performed; (ii) receiving one or more control values for said data-mining task; (iii) executing a task definition application, said task definition application providing parameters for the data-mining task based on the a high level task description of the data-mining task to be performed; and (iv) estimating the computational resources for performing the data-mining task over the distributed computing system based on said parameters and the one or more control values.

25. A system for estimating computational resources for running a data-mining task over a distributed computing system, the system comprising: (i) an interface for receiving a data set, based on which the data-mining task is performed and/or data descriptors describing or bounding features of the data set relevant for estimating computational resources for running the data-mining task; (ii) an interface for receiving one or more control values for said data-mining task; (iii) an interface for receiving one or more task parameters, said task parameters defining the data-mining task to be performed on said dataset; (iv) a data processing module being adapted to estimate the computational resources for performing the data-mining task over the distributed computing system based on the received data set or the received data descriptors, the one or more control values and the one or more task parameters.

26. A method comprising: (i) receiving a set of task parameters, the set of task parameters defining a target data set and a data-mining task; (ii) receiving a set of control values, the set of control values describing the data-mining task; (iii) receiving a set of data descriptors, the set of data descriptors describing the target data set; and (iv) estimating a set of computational resources required to perform the data-mining task over a distributed computing system based at least in part on the set of task parameters, the set of control values, the set of data descriptors, and an availability of the distributed computing system; wherein: at least the estimating step is performed by computer software running on computer hardware.

27. The method of item 26, further comprising: (i) generating an estimated cost required to perform the data-mining task by deriving a set of cost descriptors, the set of cost descriptors including: a number of compute iterations required to perform the data-mining task, and a complexity level of each compute iteration.

28. The method of item 27, further comprising: reporting the estimated cost required to perform the data-mining task.

29. The method of item 26, further comprising: defining a type of the data-mining task; wherein: the type is one of a regression task, a classification task, and a clustering task.

30. The method of item 29, further comprising: receiving, for a clustering task type, a clustering function for evaluating a partitioning of data included in the target data set into a plurality of data clusters.

31. The method of item 26, further comprising: (i) receiving a high-level task description of the data-mining task; (ii) deriving a set of derived parameters of the data-mining task based on the high-level task description using a task definition application; and (iii) estimating the computational resources for performing the data-mining task based on the set of derived parameters.

32. A computer program product comprising a computer readable storage medium having stored thereon: (i) first instructions executable by a device to cause the device to receive a set of task parameters, the set of task parameters defining a target data set and a data-mining task; (ii) second instructions executable by a device to cause the device to receive a set of control values, the set of control values describing the data-mining task; (iii) third instructions executable by a device to cause the device to receive a set of data descriptors, the set of data descriptors describing the target data set; and (iv) fourth instructions executable by a device to cause the device to estimate a set of computational resources required to perform the data-mining task over a distributed computing system based at least in part on the set of task parameters, the set of control values, the set of data descriptors, and an availability of the distributed computing system.

33. The computer program product of item 32, further comprising: fifth instructions executable by a device to cause the device to generate an estimated cost required to perform the data-mining task by deriving a set of cost descriptors, the set of cost descriptors including: a number of compute iterations required to perform the data-mining task, and a complexity level of each compute iteration.

34. The computer program product of item 33, further comprising: sixth instructions executable by a device to cause the device to report the estimated cost required to perform the data-mining task.

35. The computer program product of item 32, further comprising: fifth instructions executable by a device to cause the device to define a type of the data-mining task; wherein: the type is one of a regression task, a classification task, and a clustering task.

36. The computer program product of item 35, further comprising: sixth instructions executable by a device to cause the device to receive, for a clustering task type, a clustering function for evaluating a partitioning of data included in the target data set into a plurality of data clusters.

37. The computer program product of item 32, further comprising: (i) fifth instructions executable by a device to cause the device to receive a high-level task description of the data-mining task; (ii) sixth instructions executable by a device to cause the device to derive a set of derived parameters of the data-mining task based on the high-level task description using a task definition application; and (iii) seventh instructions executable by a device to cause the device to estimate the computational resources for performing the data-mining task based on the set of derived parameters.

38. A computer system comprising: a processor set; and a computer readable storage medium; wherein: the processor set is structured, located, connected, and/or programmed to execute instructions stored on the computer readable storage medium; and the instructions include: (i) first instructions executable by a device to cause the device to receive a set of task parameters, the set of task parameters defining a target data set and a data-mining task; (ii) second instructions executable by a device to cause the device to receive a set of control values, the set of control values describing the data-mining task; (iii) third instructions executable by a device to cause the device to receive a set of data descriptors, the set of data descriptors describing the target data set; and (iv) fourth instructions executable by a device to cause the device to estimate a set of computational resources required to perform the data-mining task over a distributed computing system based at least in part on the set of task parameters, the set of control values, the set of data descriptors, and an availability of the distributed computing system.

39. The computer system of item 38, further comprising: fifth instructions executable by a device to cause the device to generate an estimated cost required to perform the data-mining task by deriving a set of cost descriptors, the set of cost descriptors including: a number of compute iterations required to perform the data-mining task, and a complexity level of each compute iteration.

40. The computer system of item 39, further comprising: sixth instructions executable by a device to cause the device to report the estimated cost required to perform the data-mining task.

41. The computer system of item 38, further comprising: fifth instructions executable by a device to cause the device to define a type of the data-mining task; wherein: the type is one of a regression task, a classification task, and a clustering task.

42. The computer system of item 41, further comprising: sixth instructions executable by a device to cause the device to receive, for a clustering task type, a clustering function for evaluating a partitioning of data included in the target data set into a plurality of data clusters.

43. The computer system of claim 38, further comprising: (i) fifth instructions executable by a device to cause the device to receive a high-level task description of the data-mining task; (ii) sixth instructions executable by a device to cause the device to derive a set of derived parameters of the data-mining task based on the high-level task description using a task definition application; and (iii) seventh instructions executable by a device to cause the device to estimate the computational resources for performing the data-mining task based on the set of derived parameters.

44. A method comprising: (i) receiving a data set; (ii) receiving a set of control values; (iii) receiving a set of data-mining task parameters; and (iv) estimating a set of computational resources required to perform a data-mining task; wherein: the set of control values describes the data-mining task; the set of data-mining task parameters defines the data set and the data-mining task; the set of computational resources is based at least in part on the data set, the set of control values, and the set of data-mining task parameters; and at least the estimating step is performed by computer software running on computer hardware.

45. The method of item 44, wherein: the set of control values includes an accuracy and a temporal duration; the accuracy is an estimation of the set of computational resources; and the temporal duration is a time period to perform the data-mining task.

46. The method of item 44, wherein estimating the set of computational resources includes: (i) recalling a set of prior computational resource estimates; and (ii) receiving a set of prior computational resource costs; wherein: the set of prior computational resource costs corresponds to the set of prior computational resource estimates.

47. The method of item 44, wherein estimating the set of computational resources includes: (i) estimating a set of process flows for the data-mining task; and (ii) estimating a set of computational resources required for each process flow in the set of process flows; wherein: different flows in the set of process flows represent different manners of completing the data-mining task.

48. A computer system comprising: a processor set; and a computer readable storage medium; wherein: the processor set is structured, located, connected, and/or programmed to execute instructions stored on the computer readable storage medium; and the instructions include: (i) first instructions executable by a device to cause the device to receive a data set; (ii) second instructions executable by a device to cause the device to receive a set of control values; (iii) third instructions executable by a device to cause the device to receive a set of data-mining task parameters; and (iv) fourth instructions executable by a device to cause the device to estimate a set of computational resources required to perform a data-mining task; wherein: the set of control values describes the data-mining task; the set of data-mining task parameters defines the data set and the data-mining task; and the set of computational resources is based at least in part on the data set, the set of control values, and the set of data-mining task parameters.

49. The computer system of item 48, wherein the fourth instructions to estimate the set of computational resources includes: (i) fifth instructions executable by a device to cause the device to recall a set of prior computational resource estimates; and (ii) sixth instructions executable by a device to cause the device to receive a set of prior computational resource costs; wherein: the set of prior computational resource costs corresponds to the set of prior computational resource estimates.

50. The computer system of item 49, wherein the fourth instructions to estimate the set of computational resources includes: (i) fifth instructions executable by a device to cause the device to estimate a set of process flows for the data-mining task; and (ii) sixth instructions executable by a device to cause the device to estimate a set of computational resources required for each process flow in the set of process flows; wherein: different flows in the set of process flows represent different manners of completing the data-mining task.

What is claimed is:

1. A method comprising:
receiving a set of task parameters, the set of task parameters defining a target data set and a data-mining task;
receiving a set of control values, the set of control values describing the data-mining task;
receiving a set of data descriptors, the set of data descriptors describing the target data set;
estimating a set of computational resources required to perform the data-mining task over a distributed computing system based at least in part on the set of task parameters, the set of control values, the set of data descriptors, and an availability of the distributed computing system; and
estimating a cloud cost for the data mining task;
wherein:
at least the estimating step is performed by computer software running on computer hardware.

2. The method of claim 1, further comprising:
generating an estimated cost required to perform the data-mining task by deriving a set of cost descriptors, the set of cost descriptors including:
a number of compute iterations required to perform the data-mining task, and
a complexity level of each compute iteration.

3. The method of claim 2, further comprising:
reporting the estimated cost required to perform the data-mining task.

4. The method of claim 1, further comprising:
defining a type of the data-mining task;
wherein:
the type is one of a regression task, a classification task, and a clustering task.

5. The method of claim 4, further comprising:
receiving, for a clustering task type, a clustering function for evaluating a partitioning of data included in the target data set into a plurality of data clusters.

6. The method of claim 1, further comprising:
receiving a high-level task description of the data-mining task;
deriving a set of derived parameters of the data-mining task based on the high-level task description using a task definition application; and
estimating the computational resources for performing the data-mining task based on the set of derived parameters.

7. A computer program product comprising a computer readable storage medium having stored thereon:
first instructions executable by a device to cause the device to receive a set of task parameters, the set of task parameters defining a target data set and a data-mining task;
second instructions executable by a device to cause the device to receive a set of control values, the set of control values describing the data-mining task;
third instructions executable by a device to cause the device to receive a set of data descriptors, the set of data descriptors describing the target data set;
fourth instructions executable by a device to cause the device to estimate a set of computational resources required to perform the data-mining task over a distributed computing system based at least in part on the set of task parameters, the set of control values, the set of data descriptors, and an availability of the distributed computing system; and
fifth instructions executable by a device to cause the device to estimate a cloud cost for the data mining task.

8. The computer program product of claim 7, further comprising:
sixth instructions executable by a device to cause the device to generate an estimated cost required to perform the data-mining task by deriving a set of cost descriptors, the set of cost descriptors including:
a number of compute iterations required to perform the data-mining task, and
a complexity level of each compute iteration.

9. The computer program product of claim 8, further comprising:
seventh instructions executable by a device to cause the device to report the estimated cost required to perform the data-mining task.

10. The computer program product of claim 7, further comprising:
sixth instructions executable by a device to cause the device to define a type of the data-mining task;
wherein:
the type is one of a regression task, a classification task, and a clustering task.

11. The computer program product of claim 10, further comprising:
seventh instructions executable by a device to cause the device to receive, for a clustering task type, a clustering function for evaluating a partitioning of data included in the target data set into a plurality of data clusters.

12. The computer program product of claim 7, further comprising:
sixth instructions executable by a device to cause the device to receive a high-level task description of the data-mining task;
seventh instructions executable by a device to cause the device to derive a set of derived parameters of the data-mining task based on the high-level task description using a task definition application; and
eighth instructions executable by a device to cause the device to estimate the computational resources for performing the data-mining task based on the set of derived parameters.

13. A computer system comprising:
a processor set; and
a computer readable storage medium;
wherein:
the processor set is structured, located, connected, and/or programmed to execute instructions stored on the computer readable storage medium; and
the instructions include:
first instructions executable by a device to cause the device to receive a set of task parameters, the set of task parameters defining a target data set and a data-mining task;
second instructions executable by a device to cause the device to receive a set of control values, the set of control values describing the data-mining task;
third instructions executable by a device to cause the device to receive a set of data descriptors, the set of data descriptors describing the target data set;
fourth instructions executable by a device to cause the device to estimate a set of computational resources required to perform the data-mining task over a distributed computing system based at least in part on the set of task parameters, the set of control values, the set of data descriptors, and an availability of the distributed computing system; and
fifth instructions executable by a device to cause the device to estimate a cloud cost for the data mining task.

14. The computer system of claim 13, further comprising:
sixth instructions executable by a device to cause the device to generate an estimated cost required to perform the data-mining task by deriving a set of cost descriptors, the set of cost descriptors including:
a number of compute iterations required to perform the data-mining task, and
a complexity level of each compute iteration.

15. The computer system of claim 14, further comprising:
seventh instructions executable by a device to cause the device to report the estimated cost required to perform the data-mining task.

16. The computer system of claim 13, further comprising:
sixth instructions executable by a device to cause the device to define a type of the data-mining task;
wherein:
the type is one of a regression task, a classification task, and a clustering task.

17. The computer system of claim 16, further comprising:
seventh instructions executable by a device to cause the device to receive, for a clustering task type, a clustering function for evaluating a partitioning of data included in the target data set into a plurality of data clusters.

18. The computer system of claim 13, further comprising:
sixth instructions executable by a device to cause the device to receive a high-level task description of the data-mining task;
seventh instructions executable by a device to cause the device to derive a set of derived parameters of the data-mining task based on the high-level task description using a task definition application; and
eighth instructions executable by a device to cause the device to estimate the computational resources for performing the data-mining task based on the set of derived parameters.

* * * * *